US010944695B2

(12) United States Patent
Reynolds et al.

(10) Patent No.: US 10,944,695 B2
(45) Date of Patent: Mar. 9, 2021

(54) UPLINK PORT OVERSUBSCRIPTION DETERMINATION

(71) Applicant: Hewlett Packard Enterprise Development LP, Houston, TX (US)

(72) Inventors: Shawn E. Reynolds, Roseville, CA (US); Shaun Wakumoto, Roseville, CA (US); Jay G. Schudel, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/567,324

(22) PCT Filed: Apr. 30, 2015

(86) PCT No.: PCT/US2015/028605
§ 371 (c)(1),
(2) Date: Oct. 17, 2017

(87) PCT Pub. No.: WO2016/175849
PCT Pub. Date: Nov. 3, 2016

(65) Prior Publication Data
US 2018/0115501 A1    Apr. 26, 2018

(51) Int. Cl.
*H04L 12/931* (2013.01)
*H04L 12/825* (2013.01)
(Continued)

(52) U.S. Cl.
CPC ........ *H04L 49/505* (2013.01); *H04L 41/0677* (2013.01); *H04L 43/0882* (2013.01);
(Continued)

(58) Field of Classification Search
CPC ............... H04L 49/505; H04L 41/0677; H04L 43/0882; H04L 43/0894; H04L 47/25;
(Continued)

(56) References Cited

U.S. PATENT DOCUMENTS 6,879,560 B1    4/2005 Cahn
7,580,351 B2    8/2009 Bettink et al.
(Continued)

FOREIGN PATENT DOCUMENTS

KR    1020110039498    4/2011

OTHER PUBLICATIONS

International Searching Authority, The International Search Report and the Written Opinion, dated Mar. 2, 2016, PCT/US2015/028605, 12 Pgs.
(Continued)

*Primary Examiner* — Faruk Hamza
*Assistant Examiner* — Tito Q Pham
(74) *Attorney, Agent, or Firm* — Hewlett Packard Enterprise Patent Development

(57) ABSTRACT

In some examples, a method can include monitoring data traffic along an uplink port and along at least a subset of a plurality of host ports, determining whether the uplink port is oversubscribed based on the monitored data traffic, determining whether a given host port of the at least a subset of host ports is receiving excessive data traffic in response to determining that the uplink port is oversubscribed, and flagging a host port that is determined to be receiving excessive data traffic.

17 Claims, 9 Drawing Sheets

(51) Int. Cl.
*H04L 12/26* (2006.01)
*H04L 29/06* (2006.01)
*H04L 12/24* (2006.01)

(52) U.S. Cl.
CPC .......... *H04L 43/0894* (2013.01); *H04L 47/25* (2013.01); *H04L 49/50* (2013.01); *H04L 49/501* (2013.01); *H04L 63/1416* (2013.01); *H04L 63/1458* (2013.01); *H04L 41/0816* (2013.01)

(58) Field of Classification Search
CPC ... H04L 49/50; H04L 49/501; H04L 63/1416; H04L 63/1458
See application file for complete search history.

(56) References Cited

U.S. PATENT DOCUMENTS

| | | |
|---|---|---|
| 7,818,795 B1 | 10/2010 | Arad |
| 7,860,006 B1 | 12/2010 | Kashyap et al. |
| 7,873,048 B1 | 1/2011 | Kondapalli |
| 8,050,260 B1 | 11/2011 | Dropps et al. |
| 8,174,980 B2 | 5/2012 | Ford et al. |
| 8,767,549 B2 | 7/2014 | Kashyap et al. |
| 8,797,866 B2 | 8/2014 | Leavy |
| 2002/0133613 A1 | 9/2002 | Teng et al. |
| 2005/0100011 A1* | 5/2005 | Chiruvolu ............... H04L 47/10 370/389 |
| 2006/0092837 A1* | 5/2006 | Kwan .................... H04L 47/10 370/229 |
| 2007/0011734 A1 | 1/2007 | Balakrishnan et al. |
| 2009/0300209 A1 | 12/2009 | Elzur |
| 2009/0300759 A1* | 12/2009 | Wang ................ H04L 63/1458 726/22 |
| 2011/0141924 A1 | 6/2011 | Froehlich et al. |
| 2011/0158248 A1* | 6/2011 | Vorunganti ............ H04L 47/12 370/412 |
| 2012/0218901 A1 | 8/2012 | Jungck et al. |
| 2013/0003546 A1 | 1/2013 | Matthews et al. |
| 2013/0136011 A1 | 5/2013 | Tardo et al. |
| 2014/0022901 A1* | 1/2014 | Suzuki .................... H04L 49/15 370/235 |
| 2014/0380457 A1* | 12/2014 | Cassell ............... H04L 63/1458 726/13 |

OTHER PUBLICATIONS

Ling, V.T.L., "Adaptive Response System for Distributed Denial of Service Attacks", Aug. 2008, 204 Pgs.
International Preliminary Report on Patentability received for PCT Application No. PCT/US2015/028605, dated Nov. 9, 2017, 9 pages.
Extended European Search Report and Written Opinion received for European Patent Application No. 15890979.6, dated Jul. 3, 2018, 8 pages.

* cited by examiner

UPLINK PORT OVERSUBSCRIPTION DETERMINATION

BACKGROUND

Computer networks can be used to allow networked devices, such as personal computers, servers, and data storage devices to exchange data. Computer networks often include intermediary datapath devices such as network switches, gateways, and routers, to flow traffic along selected data routing paths between networked devices. A data routing path can, for example, be selected by a network controller, administrator, or another entity, and can, for example, be based on network conditions, network equipment capabilities, or other factors.

BRIEF DESCRIPTION OF THE DRAWINGS

For a detailed description of various examples, reference will now be made to the accompanying drawings in which.

DETAILED DESCRIPTION

Figure 1:
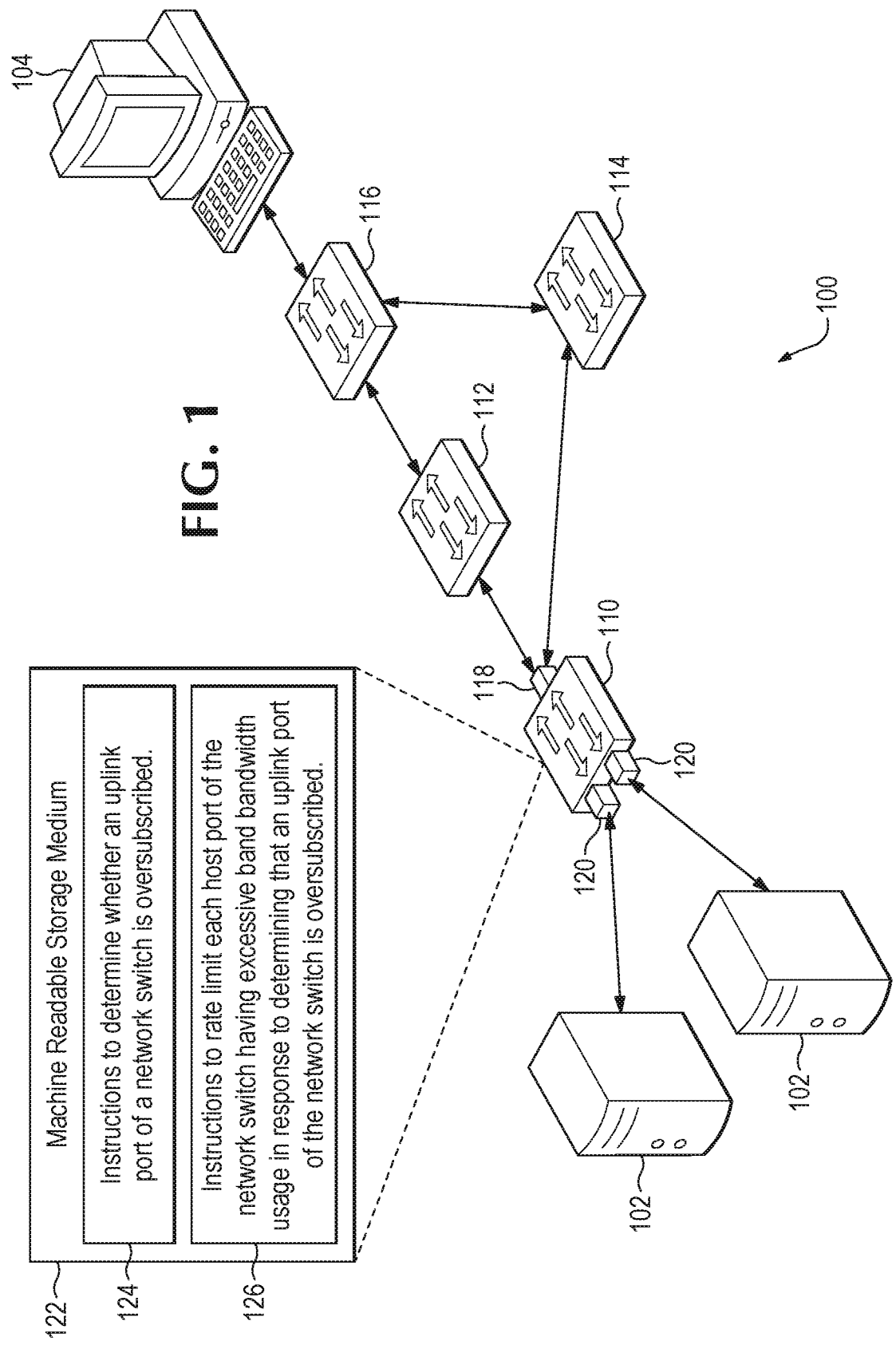
FIG. 1 is a diagram of a network, according to an example.

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on. Also, as used herein, "a plurality of" something can refer to more than one of such things.

In some networks, a data network edge switch or other network device can be vulnerable to attacks in which high amounts of traffic are flooded onto the network. In some situations, as a result of such attacks, uplink ports of the switch (or other device) can be oversubscribed, which can cause connectivity issues, such as situations in which legitimate traffic is undesirably dropped. Such attacks can be in the form of Denial-of-Service (DoS) style attacks that use traffic generators to flood traffic through the network. For example, in some situations, a malicious user can connect a computer to a network and flood traffic through a network switch by attaching a traffic generator and sending line rate broadcast traffic that is intended to overflow uplink ports of the switch. Network switches can also face uplink port oversubscription issues due to network loops or other inefficient bandwidth usage on downstream unmanaged switches. For example, if an unmanaged switch has been plugged into the network, a loop can be created on the unmanaged switch or hub that would generate an excessive amount of traffic in the form of packets that could flood the network. Such excessive traffic can, in some situations, saturate uplink ports of a network switch and interrupt connectivity for other users on the network. Moreover, network switches can, in some situations, face uplink port oversubscription issues due to excessive network use by file transfer applications, such as for example certain peer-to-peer (P2P) applications and/or file server applications. For example, if multiple hosts are performing file transfer, peer to peer data transfers, or excessive file transfers, such usage can cause undue congestion on the network and potentially oversubscribe uplink ports on network switches or other devices in the network.

Certain implementations of the present disclosure are intended to address the above issues by flagging one or more host ports that are determined to be excessively contributing to a determined oversubscription of an uplink port on a network switch or other network device. As described in further detail herein, once certain host ports are flagged, the flagged host ports can, for example, be rate limited, disabled, etc. In some implementations, once a host port is flagged, a network administrator can be notified and/or other actions can be manually or automatically performed. The use of such a method in addition to related software and/or hardware, can in some situations, be used to reduce the likelihood that certain host ports can disrupt the network.

An example implementation of such a method includes (a) monitoring data traffic along an uplink port and along at least a subset of a plurality of host ports, (b) determining whether the uplink port is oversubscribed based on the monitored data traffic, (c) determining whether a given host port of the at least a subset of host ports is receiving excessive data traffic in response to determining that the uplink port is oversubscribed, and (d) flagging a host port that is determined to be receiving excessive data traffic. Additional details regarding this method are described below at least with respect to the method of FIG. 2 and it is appreciated that other steps can be performed in furtherance of the stated objectives of the present disclosure or to provide additional or alternative functionality. Other advantages of implementations presented herein will be apparent upon review of the description and figures.

FIG. 1 is a diagram of a simplified example network 100. In network 100, traffic (e.g., in the form of data packets) can be communicated between source nodes 102 and a destination node 104. Source nodes 102 are in data communication with destination node 104 via multiple intermediate network nodes 110, 112, 114, and 116 which can, for example and as described in further detail below, be in the form of network switches or other data forwarding devices. The various nodes of network 100 are connected to each other via various wired or wireless data links.

Source nodes 102 and destination node 104 can, for example, be in the form of network hosts or other suitable types of network nodes. Only two source nodes 102 and a single destination node 104 are illustrated in simplified example network 100. However, it is appreciated that different implementations of network 100 may include a single source node 102, more than two source nodes 102, and multiple destination nodes 104. It is further appreciated, that the designation "source" and "destination" are used for illustration and that a source node may serve as a destination node for certain applications and a destination node may serve as a source node for certain applications. One or more of source nodes 102 and destination node 104 can be in the form of suitable servers, desktop computers, laptops, printers, etc. As but one example, source nodes 102 can be in the form of standalone storage server appliances, and destination node 104 can be in the form of a desktop computer including a monitor for presenting information to an operator and a keyboard and mouse for receiving input from an operator. It is appreciated that the source and destination nodes can be in the form of endpoint nodes on network 100, intermediate nodes between endpoint nodes, or other types of network nodes. In the simplified example network 100 depicted in FIG. 1, the various network nodes connecting source nodes 102 and destination node 104 are in the form of intermediary nodes and host devices. It is appreciated however, that the implementations described herein can be used or adapted for networks including more or fewer devices, different types of devices, and different network arrangements.

Nodes 110, 112, 114, and 116 can, for example, be in the form of switches or other multi-port network bridges that process and forward data at the data link layer. In some implementations, one or more of the nodes can be in the form of multilayer switches that operate at multiple layers of the OSI model (e.g., the data link and network layers). Although the term "switch" is used throughout this description, it is appreciated that this term can refer broadly to other suitable network data forwarding devices. For example, a general purpose computer can include suitable hardware and machine-readable instructions that allow the computer to function as a network switch. It is appreciated that the term "switch" can include other network data path elements in the form of suitable routers, gateways and other devices that provide switch-like functionality for network 100.

Node 110, which is referred to herein as a network switch (and illustrated as a network edge switch in FIG. 1) for consistency but may be another type of network node, can for example be in the form of a network edge switch, including an uplink port 118, a plurality of host ports 120, and a machine readable storage medium 122 having stored thereon machine readable instructions to cause a computer processor to determine whether an uplink port of a network switch is oversubscribed (instructions 124) and rate limit each host port of the network switch having excessive bandwidth usage in response to determining that an uplink port of the network switch is oversubscribed (instructions 126). Further details regarding medium 122 are provided below with respect to FIG. 8. It is appreciated that switch 110 can include mediums, memory resources, machine readable instructions, or other aspects of other implementations described herein.

Nodes within network 100 can forward traffic along a datapath based on metadata within the traffic. For example, traffic received at the node can be in the form of a packet. For illustration, the networking term "packet" is used herein, however, it is appreciated that the term "packet" can refer to any suitable protocol data unit (PDU). The packet can, for example, include payload data as well as metadata in the form of control data. Control data can, for example, provide data to assist the node with reliably delivering the payload data. For example, control data can include network addresses for source and destination nodes, error detection codes, sequencing information, and packet size of the packet. In contrast, payload data can include data carried on behalf of an application for use by a source node or destination node.

Each node within network 100 can, for example, help manage the flow of data across a network by only transmitting a received message to a destination device for which the message was intended (or to an intermediary device en route to the destination device). In some implementations, such nodes can rely on flow entries in flow tables stored on a machine-readable medium within each switch (or otherwise accessible by each switch). Each flow entry in a flow table can, for example, contain information such as: (1) match fields to match against packets (e.g., an ingress port and specific packet header fields), (2) a priority value for the flow entry to allow prioritization over other flow entries, (3) counters that are updated when packets are matched, (4) instructions to modify the action set or pipeline processing, and (5) timeouts indicating a maximum amount of time or idle time before a flow is expired by the switch, and (6) a cookie value which can in some nodes be used to filter flow statistics, flow modification, and flow deletion.

Figure 2:
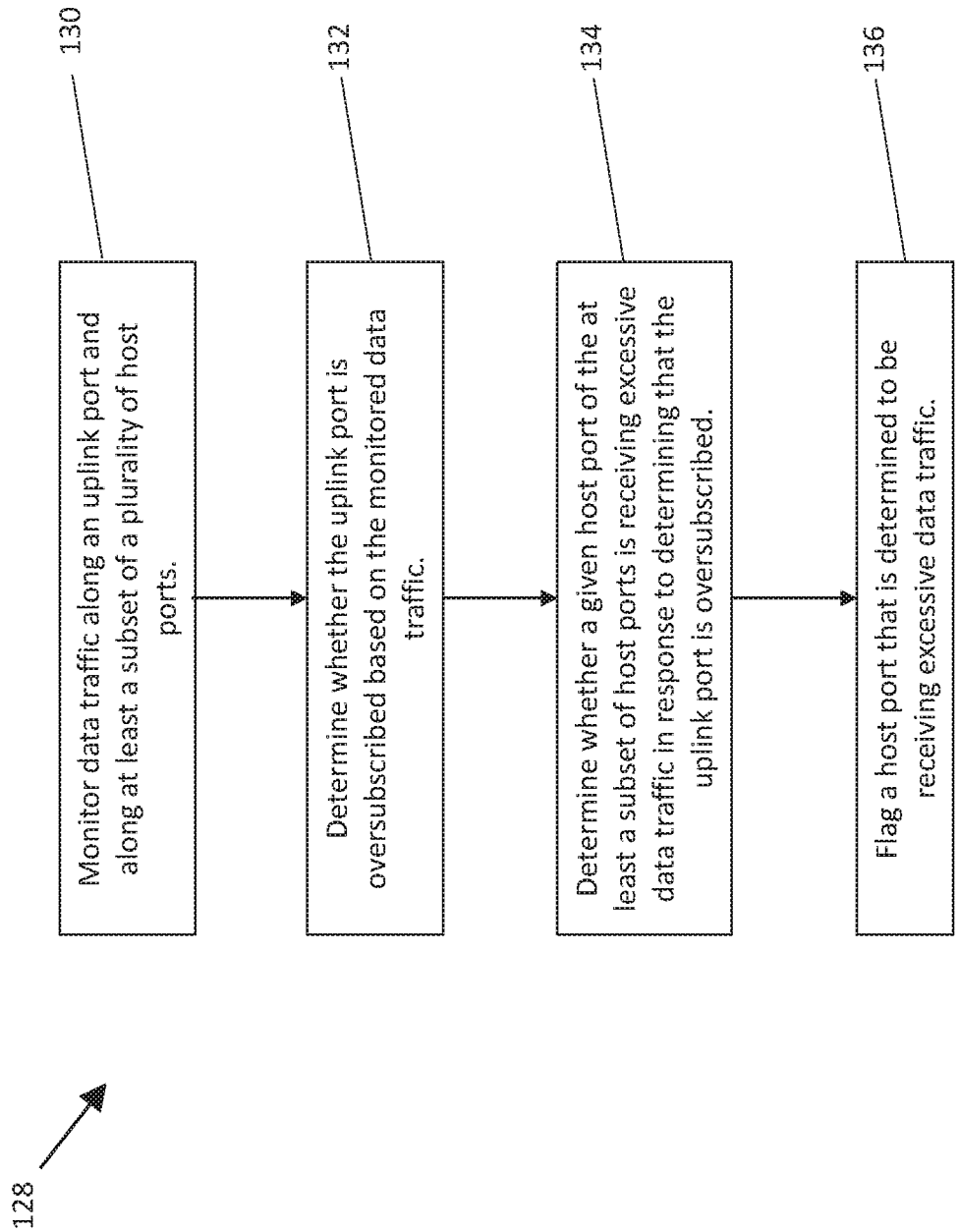
FIG. 2 is a flowchart for a method, according to an example.

Switch 110 can, for example, be in the form of a physical hardware-based switch. However, in some implementations, switch 110 or other elements of network 100 can be in the form of a virtualized network switch. The term "virtual" (and its variants) as used herein can, for example, refer to a computer network that includes, at least in part, virtual network links and virtual devices implemented using methods of network virtualization. As but one example, a virtual switch can be implemented to a virtual network, which can allow virtual machines to communicate using the same protocols as physical switches. The virtual switch can, for example, emulate a traditional physical Ethernet network switch by forwarding frames at the data-link layers. Similarly, virtual routers can be implemented that are designed to route packets from one network to another based on decisions taken from routing tables. The functionality of such a virtual router may be similar to that of a physical router but packets can be sent between virtual machines in different networks. Virtual machines can, for example, have virtual Ethernet cards, which can be treated similarly to a physical (i.e., non-virtual) Network Interface Card (NIC) for use in a physical (i.e., non-virtual) network, FIG. 2 is a flowchart for a method 128 implemented in network switch 110 or another network node. In some implementations, method 128 can be implemented in the form of executable instructions stored on a memory resource (e.g., the memory resource of the switch of FIG. 6), executable machine readable instructions stored on a storage medium (e.g., on medium 122 of FIG. 8), in the form of electronic circuitry (e.g., on an Application-Specific integrated Circuit (ASIC), or another suitable form. Although the description of method 128 herein primarily refers to steps performed on a switch 110 for purposes of illustration, it is appreciated that method 128 can be executed on another type of network node or other network device.

Method 128 includes a step 130 of monitoring data traffic along an uplink port and along at least a subset of a plurality of host ports. A network administrator can, for example, designate which ports of network switch 110 or other network node are uplink port(s) 118 and which ports are host ports 120. Although only one uplink port 118 is shown on switch 110 of FIG. 1, it is appreciated that switch 110 can include any suitable number of uplink ports 118. In some implementations, uplink ports 118 and host ports 120 can be designated as a result of steps performed by machine readable instructions running on switch 110 or on a remote device, such as a remote network controller (e.g., a Software Defined Network (SON) controller in communication with switch 110). It is appreciated that in implementations where switch 110 is a network edge switch 110, ports that connect the sub-net to a greater network can be designated as uplink ports 118. As used herein, the term "edge switch" can, for example, refer to a switch that is located at a meeting point between two networks. Such a switch can, for example, connects a local area network (LAN) to an Internet Service Provider's (ISP's) network or backbone. In some implementations, uplink ports can be in the form of ports, a VLAN, or a trunk. In some implementations, the designation of uplink ports 118 and host ports 120 can be determined based on specific applications of switch 110 with a single port serving as an uplink port 118 at certain times and with the same port serving as a host port 120 at other times.

As provided above, data traffic along an uplink port and along at least a subset of a plurality of host ports can be monitored for analysis by later steps of method 128. In some implementations, data traffic along the uplink and host ports is monitored by switch 110. In some implementations, such data traffic is monitored by a remote computing device in communication with switch. It is appreciated that the term "monitor" or "monitoring" as used herein can refer to the act of sensing traffic data as well as the acts of analyzing the data for trends or other patterns, as well as other related activities. In some implementations, the data traffic can be monitored for bandwidth use of the uplink port and at least a subset of the plurality of host ports. In some implementations, the data traffic can be monitored for other information, such as for example, network throughput, resiliency, transit delay, priority, protection, residual error rate, etc.

Method 128 includes a step 132 of determining whether uplink port 118 is oversubscribed based on the monitored data traffic. In some implementations, determining whether the uplink port is oversubscribed can, for example, include comparing data traffic metrics over the uplink port to reference data traffic metrics for the uplink port. It is appreciated that the determination of step 132 can be based on more advanced criteria than a simple comparison of values. For example, in some implementations, oversubscription criteria can include multiple reference metrics that can dynamically change based on time, network conditions, or other factors. In some implementations, step 132 can include switch 110 determining that uplink port 118 is oversubscribed by being notified by hardware of switch 110 or another computing device. As a specific, non-limiting example, an ASIC may be used to determine whether uplink port 118 is oversubscribed without separate software instructions. Once such an ASIC determines that uplink port 118 is oversubscribed it can report this information to a processing resource of switch for further handling or analysis in accordance with the present disclosure.

Method 128 includes a step 134 of determining whether a given host port (e.g., a first host port) of the at least a subset of host ports 120 (i.e., all of host ports 120 or a subset of host ports 120) is receiving excessive data traffic in response to determining that uplink port 118 is oversubscribed. In some implementations, determining whether the given host port of the plurality of host ports is receiving excessive data traffic includes determining whether every host port of the plurality of host ports is receiving excessive data traffic.

Like step 132 of determining whether uplink port 118 is oversubscribed based on the monitored data traffic, determining whether a given host port 120 is receiving excessive data traffic can, for example, include comparing data traffic metrics over the given host port to reference data traffic metrics for the host port. In some implementations, different host ports 120 on switch 110 may have different reference data traffic metrics or may, in some implementations have the same reference data traffic metrics. Moreover, similar to step 132, it is appreciated that the determination of step 134 can be based on more advanced criteria than a simple comparison of values. For example, in some implementations, criteria related to determining whether excessive data is being received by host port 120 can include multiple reference metrics that can dynamically change based on time, network conditions, or other factors. Moreover, similar to step 132, in some implementations, step 134 can include switch 110 determining that a given host port 120 is receiving excessive data traffic by being notified by hardware of switch 110 or another computing device.

Method 128 includes a step 136 of flagging a host port that is determined to be receiving excessive data traffic. In some implementations, flagging a host port can include modifying a bit associated with the host port. For example, a bit value of 0 can indicate that the host port is not flagged whereas a bit value of 1 can indicate that the host port is flagged. It is appreciated that other information may be included beyond a "yes" or "no" indicator such as a 1 or 0. For example, in some implementations, step 136 can include providing information regarding data traffic over the flagged host port, such as a value corresponding to an amount of bandwidth used. Other information that may be useful for rate limiting, disabling, or otherwise handling host port can be included in the flagging procedure of step 136. As described below with respect to the methods of FIGS. 3, 4, and 5, once a host port is flagged, various subsequent operations can be performed, such as one or more operations relating to rate limiting the flagged port.

Although the flowchart of FIG. 2 and description of method 128 identifies one order of performance, it is appreciated that this order (as well as the order of other methods described herein) may be rearranged into another suitable order, may be executed concurrently or with partial concurrence, include additional or comparable steps to achieve the same or comparable functionality, or a combination thereof.

Figure 3:
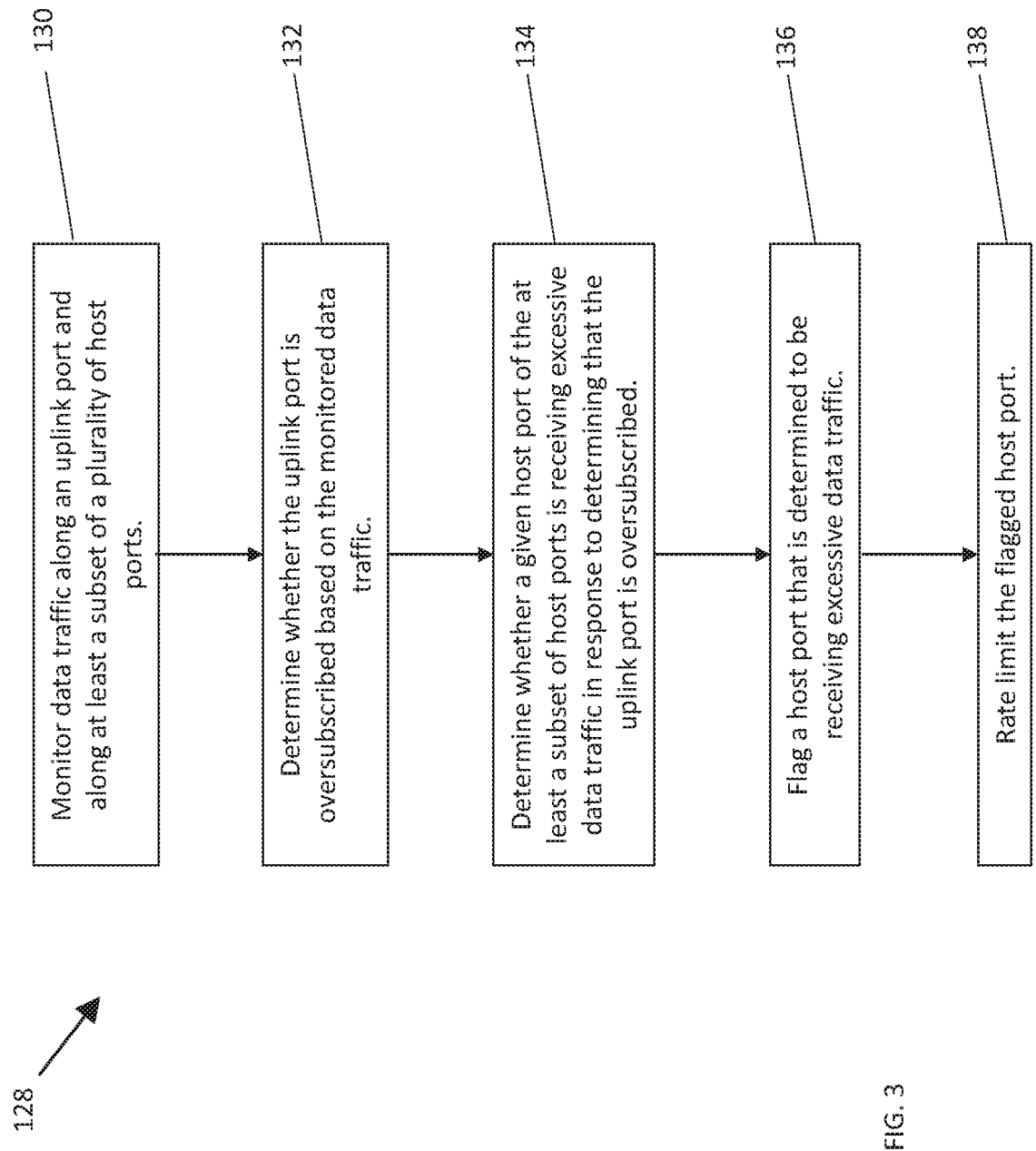
FIG. 3 is a flowchart for a method, according to another example.
Figure 4:
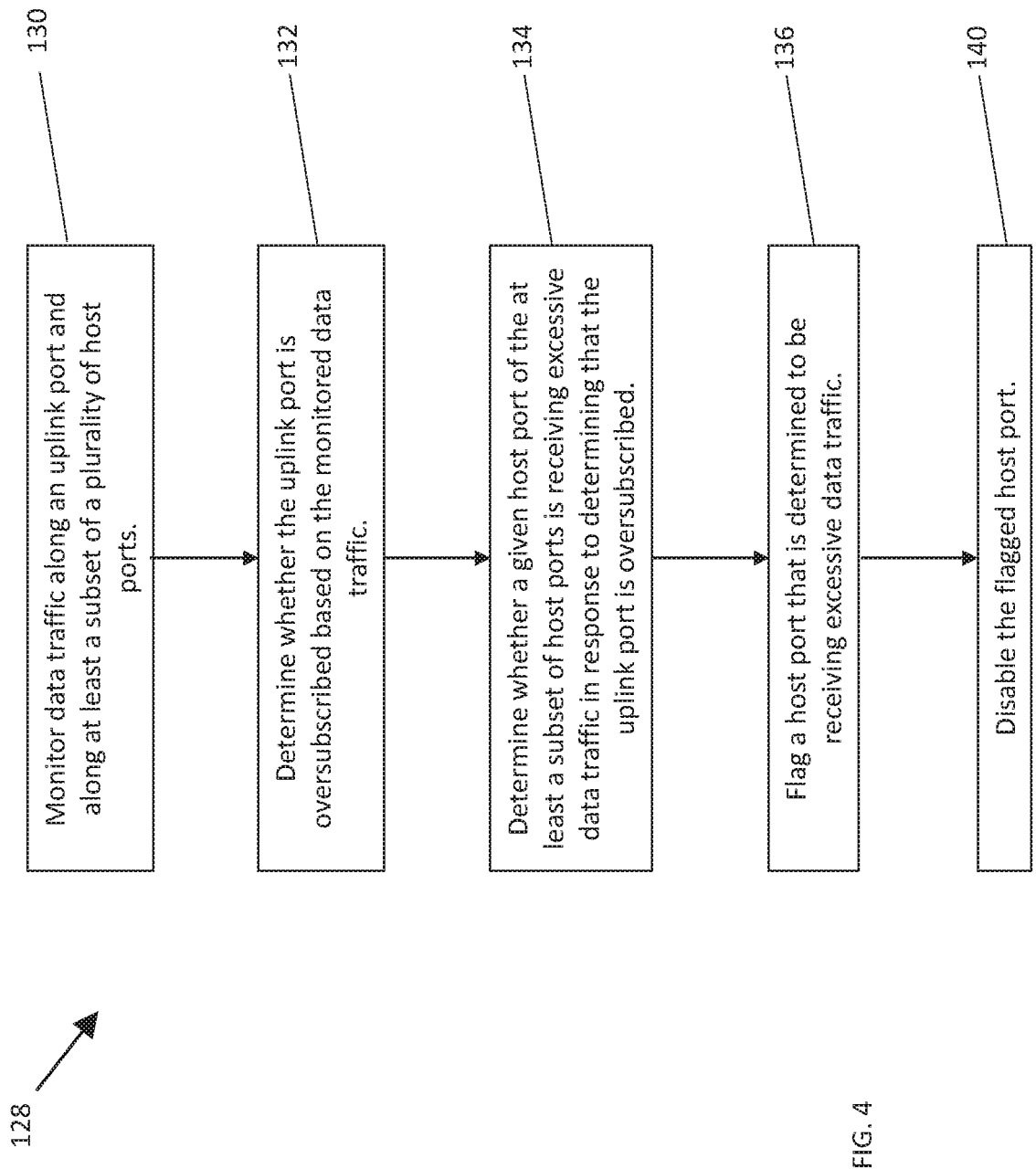
FIG. 4 is a flowchart for a method, according to another example.
Figure 5:
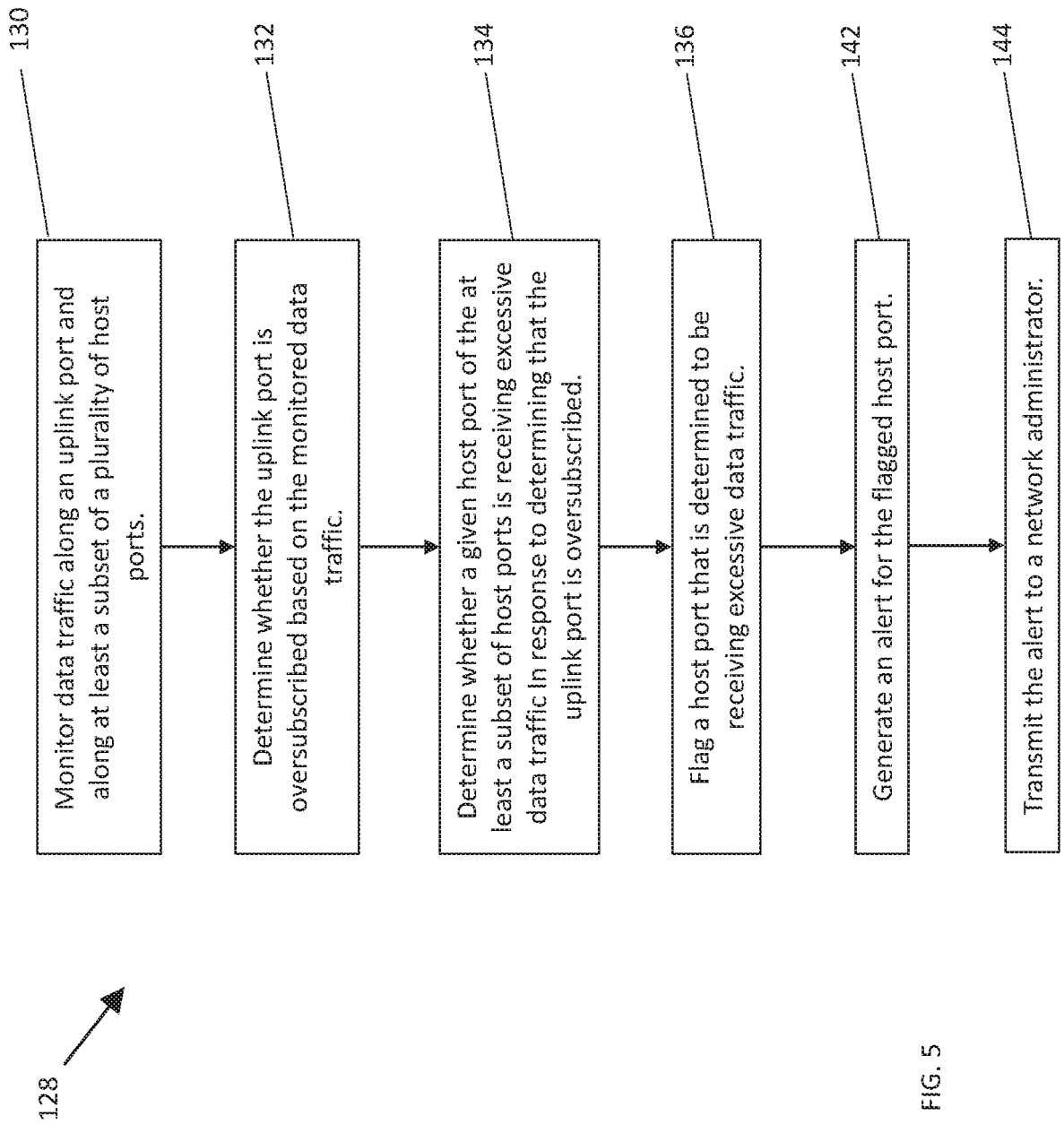
FIG. 5 is a flowchart for a method, according to another example.

FIGS. 3-5 illustrate steps that can be taken once a host port is flagged in method 128 of FIG. 2. For illustration, FIGS. 3-5 reproduce steps 130, 132, 134, and 136 from method 128 of FIG. 2, however it is appreciated that method 128 of FIGS. 3-5 can include additional, alternative, or fewer steps, functionality, etc., than method 128 of FIG. 2 and is not intended to be limited by the diagram of FIG. 2 or the related disclosure thereof. It is appreciated though that method 128 of FIG. 2 can incorporate one or more aspects of methods 128 of FIGS. 3-5 and vice versa. For example, in some implementations, method 128 of FIG. 2 can include the post-flagging handling of host ports described below with respect to methods 128 of FIGS. 3-5. The specific form of post-flagging handling of host ports can be selected or otherwise determined based on the specific nature of the reason why the flagged host port is determined to be receiving excessive data traffic, which can for example, be determined based on the monitored data traffic. In some implementations, this feature can, for example be a configurable option available to a network administrator. In situations where the flagged host port is maliciously receiving excessive data traffic as part of an attack on network 100 or on a node connected to network, more drastic post-flagging handling (e.g., disabling of the host port, alerting a network administrator, etc.) can be employed. Likewise, in situations where the flagged host port is receiving excessive data traffic due to legitimate traffic, such as for example, downloading files from a company FTP server, the flagged host port may not be rate limited, disabled, or otherwise adjusted by method 128.

Method 128 of FIG. 3 includes steps 130, 132, 134, and 136 described above with respect to method 128 FIG. 2. Method 128 of FIG. 3 further expressly illustrates a step 138 of rate limiting the flagged host port. Step 138 can, for example, be used to provide for available uplink bandwidth for legitimate traffic by rate limiting host ports when the uplink ports become over saturated. In some implementations, a rate limit will reduce by a configurable rate. For example, if over a period of time a previously rate limited uplink port is still dropping packets the host port can be further rate limited to a lower rate until the uplink port is no longer dropping packets. In some implementations, the amount that a flagged host port is rate limited can be a fixed amount. In some implementations, the amount that a flagged host port is rate limited can be calculated based on a dynamic value. For example, the dynamic value can be based on a number of dropped packets over a period of time. In such an implementation, if switch 110 is dropping a small amount of packets, a small rate limit can be applied. Likewise, if switch 110 is dropping a large amount of packets, then a higher value rate limit can be applied. In some implementations, a lowest allowed rate limit value can be provided. In such an implementation, switch 110 can be prevented from rate limiting a port lower than a configured value. The configured value can, for example, apply to all host ports equally or separate values can be provided for different host ports.

Likewise, when a previously rate limited uplink ports is monitored as not have dropped traffic for a period of time, step 138 can include increasing the previously applied rate limit. In some implementations, step 138 can include increasing the limit one host port at a time and if the bandwidth on the uplink ports still is not dropping traffic, then switch 110 can increase the rate limit on a different port until the rate is eventually restored. If the uplink port starts to again drop packets, then switch 110 can revert to the most recent rate limit changes. If there are no pending changes, switch 110 can reduce all top bandwidth using host ports by a configurable percentage.

Method 128 of FIG. 4 illustrates another example of method 128 in accordance with the present disclosure. Method 128 of FIG. 4 includes steps 130, 132, 134, and 136 described above with respect to method 128 of FIG. 2. Method 128 of FIG. 4 further expressly illustrates a step 140 of disabling the flagged host port. Step 140 can, for example, be employed if it is determined that host port 120 is sending malicious traffic, such as by participating in a DoS attack. In some implementations, step 140 can include rate limiting a host port 120 (or other post-flagging steps) before disabling host port 120. In some implementations step 140 can include disabling the flagged host port for only a period of time and then automatically re-enabling the flagged host port.

Method 128 of FIG. 5 illustrates another example of method 128 in accordance with the present disclosure. Method 128 of FIG. 5 includes steps 130, 132, 134, and 136 described above with respect to method 128 of FIG. 2. Method 128 of FIG. 5 further expressly illustrates a step 142 of generating an alert for the flagged host port and a step 144 of transmitting the alert to a network administrator. It is appreciated that steps 142 and 144 can be performed in combination with steps 138 of rate limiting the flagged host port and/or step 140 of disabling the flagged host port. It is further appreciated that steps 142 and 144 can be performed without rate limiting, disabling, or otherwise adjusting the flagged host port.

In some implementations, method 128 can include blocking the flagged host port. For example, certain Spanning Tree Protocol (STP)-enabled as well as certain other types of switches can include a port configuration blocking functionality, which can, for example, keep the port enabled, but disallow traffic to ingress and/or egress that port. This can, for example, be used by several layer 2 protocols of the Open Systems interconnection model (OSI model), such as STP which can keep redundant ports in a "blocked" state, ready as a hot-standby with a primary, redundant port in a "forwarding" state. In some implementations, when or if the active or primary forwarding port fails, the standby link can move from the "blocked" state to the "forwarding" state. In some implementations, such a blocking action can allow monitoring of an ingress traffic rate on the flagged host port, while disabling forwarding of traffic from the flagged host port. In certain implementations, if the traffic rate eventually drops to an acceptable level, the blocked host port can be unblocked.

Figure 6:
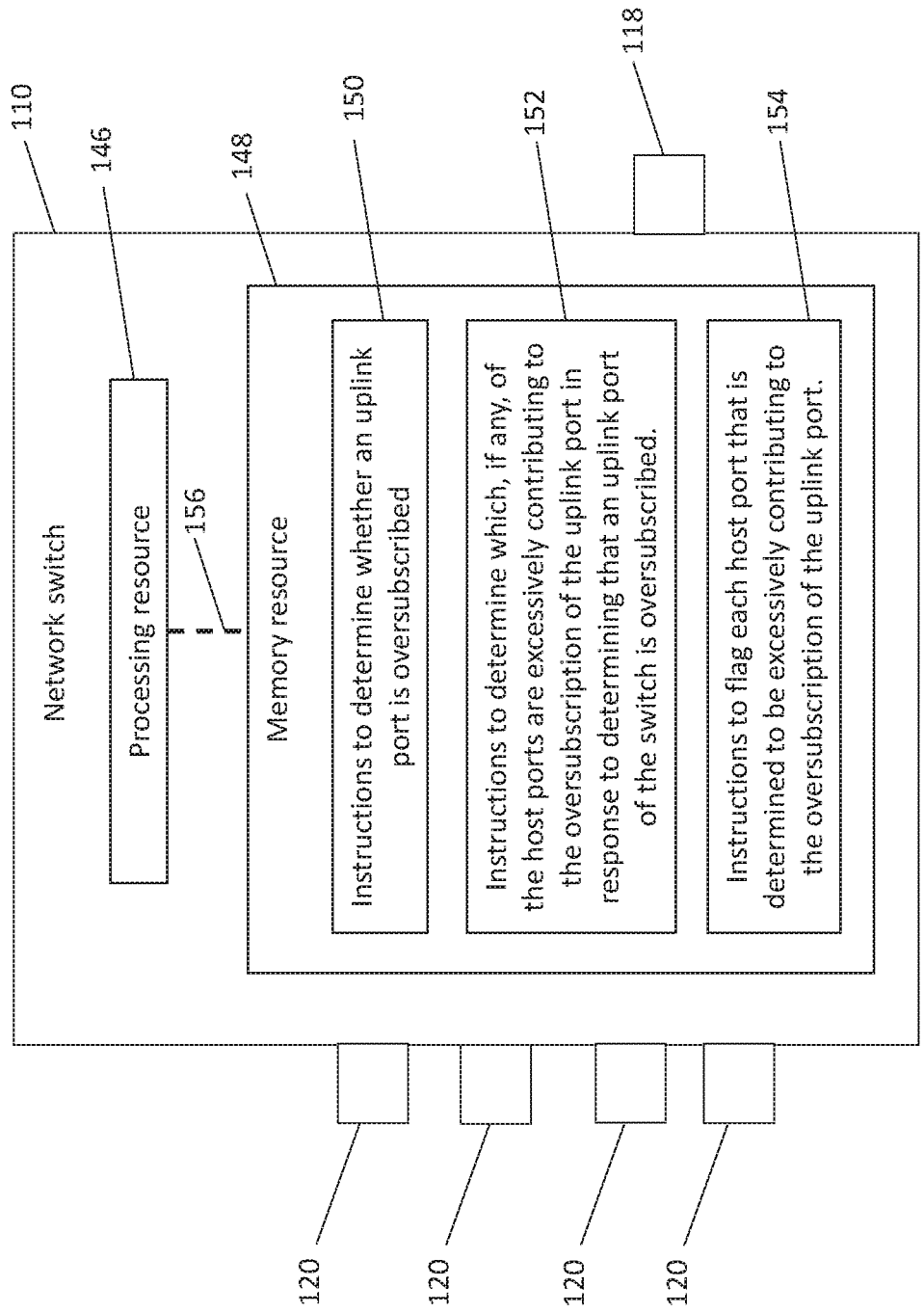
FIG. 6 is a diagram of a network switch, according to an example.

FIG. 6 illustrates a diagram of a network switch 110 in accordance with the present disclosure. As described in further detail below, switch 110 includes at least one uplink port 118, a plurality of host ports 120, a processing resource 146, and a memory resource 148 that stores machine-readable instructions that when executed by processing resource 146 are to determine whether an uplink port is oversubscribed (instructions 150), determine which, if any, of the host ports are excessively contributing to the oversubscription of the uplink port in response to a determination that an uplink port of the switch is oversubscribed (instructions 152), and flag each host port that is determined to be excessively contributing to the oversubscription of the uplink port (instructions 154). The various aspects of switch 110 including uplink port 118, host ports 120, instructions 150, 152, and 154, processing resource 146, and memory resource 148 will be described in further detail below.

As provided above, instructions 150 stored on memory resource 148 are, when executed by processing resource 146, to cause processing resource 146 to determine whether an uplink port is oversubscribed. Instructions 150 can incorporate one or more aspects of step 132 of method 128 or another suitable aspect of other implementations described herein (and vice versa). As but one example, in some implementations, instructions 150 can include determining whether the uplink port is oversubscribed by comparing data traffic metrics over the uplink port to reference data traffic metrics for the uplink port.

As provided above, instructions 152 stored on memory resource 148 are, when executed by processing resource 146, to cause processing resource 146 to determine which, if any, of the host ports are excessively contributing to the oversubscription of the uplink port in response to a determination that an uplink port of the switch is oversubscribed. Instructions 152 can incorporate one or more aspects of step 134 of method 128 or another suitable aspect of other implementations described herein (and vice versa). As but one example, in some implementations, instructions 152 can include switch 110 determining that a given host port 120 is receiving excessive data traffic by being notified by hardware of switch 110 or another computing device.

As provided above, instructions 154 stored on memory resource 148 are, when executed by processing resource 146, to cause processing resource 146 to flag each host port that is determined to be excessively contributing to the oversubscription of the uplink port. Instructions 154 can incorporate one or more aspects of step 136 of method 128 or another suitable aspect of other implementations described herein (and vice versa). As but one example, in some implementations, instructions 154 can include providing to switch 110 information that may be useful for rate limiting, disabling, or otherwise handling the flagged host port.

Processing resource 146 of switch 110 can, for example, be in the form of a central processing unit (CPU), a semiconductor-based microprocessor, a digital signal processor (DSP) such as a digital image processing unit, other hardware devices or processing elements suitable to retrieve and execute instructions stored in memory resource 148, or suitable combinations thereof. Processing resource 146 can, for example, include single or multiple cores on a chip, multiple cores across multiple chips, multiple cores across multiple devices, or suitable combinations thereof. Processing resource 146 can be functional to fetch, decode, and execute instructions as described herein. As an alternative or in addition to retrieving and executing instructions, processing resource 146 can, for example, include at least one integrated circuit (IC), other control logic, other electronic circuits, or suitable combination thereof that include a number of electronic components for performing the functionality of instructions stored on memory resource 148. The term "logic" can, in some implementations, be an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Processing resource 146 can, for example, be implemented across multiple processing units and instructions may be implemented by different processing units in different areas of switch 110.

Memory resource 148 of switch 110 can, for example, be in the form of a non-transitory machine-readable storage medium, such as a suitable electronic, magnetic, optical, or other physical storage apparatus to contain or store information such as machine-readable instructions 150, 152, and 154. Such instructions can be operative to perform one or more functions described herein, such as those described herein with respect to the method of FIGS. 2-5 or other methods described herein. Memory resource 148 can, for example, be housed within the same housing as processing resource 146 for switch 110, such as within a computing tower case for switch 110. In some implementations, memory resource 148 and processing resource 146 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory resource 148 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Memory resource 148 can be in communication with processing resource 146 via a communication link 156. Communication link 156 can be local or remote to a machine (e.g., a computing device) associated with processing resource 146. Examples of a local communication link 156 can include an electronic bus internal to a machine (e.g., a computing device) where memory resource 148 is one of volatile, non-volatile, fixed, and/or removable storage medium in communication with processing resource 146 via the electronic bus.

In some implementations, one or more aspects of switch 110 can be in the form of functional modules that can, for example, be operative to execute one or more processes of instructions 150, 152, or 154 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of a switch 110 can, for example, include one or more machine-readable storage mediums and one or more computer processors.

In view of the above, it is appreciated that the various instructions of switch 110 described above can correspond to separate and/or combined functional modules. For example, instructions 150 can correspond to an "oversubscription determination module" to determine whether an uplink port is oversubscribed, instructions 152 can correspond to a "excessive contribution determination module" to determine which, if any, of the host ports are excessively contributing to the oversubscription of the uplink port in response to a determination that an uplink port of the switch is oversubscribed, and instructions 154 can correspond to a "flagging module" to flag each host port that is determined to be excessively contributing to the oversubscription of the uplink port. It is further appreciated that a given module can be used for multiple related functions. As but one example, in some implementations, a single module can be used to both determine which, if any, of the host ports are excessively contributing to the oversubscription of the uplink port in response to a determination that an uplink port of the switch is oversubscribed (e.g., corresponding to the process of instructions 150) as well as to flag each host port that is determined to be excessively contributing to the oversubscription of the uplink port (corresponding to the process of instructions 154).

Figure 7:
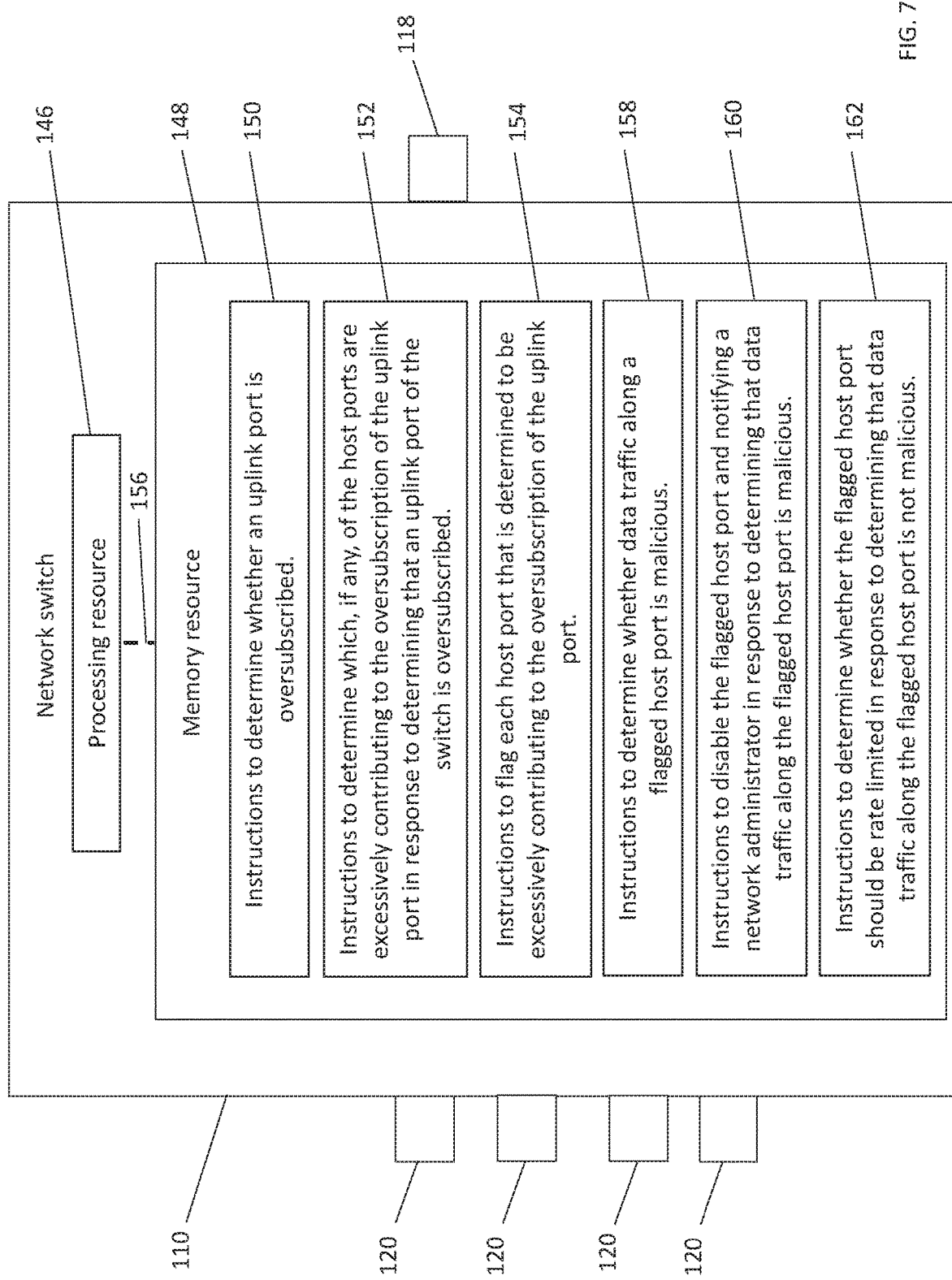
FIG. 7 is a diagram of a network switch, according to another example.

FIG. 7 illustrates a diagram of an example network switch 110 in accordance with the present disclosure. Switch 110 of FIG. 7 is illustrated as including various aspects of switch 110 of FIG. 6 and uses many of the same reference numbers (such as for example host ports 120, uplink port 118, and instructions 150, 152, and 154). However, switch 110 of FIG. 7 can include additional, alternative, or fewer components, aspects, functionality, etc., than switch 110 of FIG. 6 and is not intended to be limited by the diagram of FIG. 6 or the related disclosure thereof. It is appreciated though that switch 110 of FIG. 7 can incorporate one or more aspects of switch 110 of FIG. 6 and vice versa. For example, in some implementations, switch 110 of FIG. 6 can include the instructions described below with respect to switch 110 of FIG. 7.

Switch 110 of FIG. 7 can, for example, include instructions 158 stored on memory resource 148 are, when executed by processing resource 146, to cause processing resource 146 to determine whether data traffic along a flagged host port is malicious. In some implementations, switch 110 can include packet sniffing functionality, which can, for example, be used to detect network intrusion attempts, network misuse by internal and external users, monitor bandwidth utilization, monitor network usage, etc. In some implementations, switch 110 or a network device in communication with switch 110 can include an intrusion detection system (IDS), which can for example be in the form of a software application that can monitor a given host port for malicious activities or policy violations and can, in some implementations, produce reports to a management station. In implementations where an IDS is installed on a network device in communication with switch 110, determining whether data traffic along a flagged host port is malicious can include switch 110 receiving a report or other information from the network device indicating whether data traffic along the flagged host port is malicious. Instructions 158 can incorporate one or more aspects of steps 130, 132, and 134 of method 128 or another suitable aspect of other implementations described herein (and vice versa). As but one example, in some implementations, instructions 158 can be executable to determine whether data traffic along a flagged host port is malicious based on monitored network throughput, bandwidth, resiliency, transit delay, priority, protection, residual error rate, etc.

Switch 110 of FIG. 7 can, for example, include instructions 160 stored on memory resource 148 that are, when executed by processing resource 146, to cause processing resource 146 to disable the flagged host port and notifying a network administrator in response to determining that data traffic along the flagged host port is malicious. Instructions 160 can incorporate one or more aspects of step 140 of method 128 or another suitable aspect of other implementations described herein and vice versa). As but one example, in some implementations, instructions 160 can be executable to disable the flagged host port for only a period of time and then automatically re-enable the flagged host port.

Switch 110 of FIG. 7 can, for example, include instructions 162 stored on memory resource 148 that are, when executed by processing resource 146, to cause processing resource 146 to determine whether the flagged host port should be rate limited in response to determining that data traffic along the flagged host port is not malicious. Instructions 162 can incorporate one or more aspects of step 138 of method 128 or another suitable aspect of other implementations described herein (and vice versa). As but one example, in some implementations, instructions 162 can be executable to calculate an amount that a flagged host port is rate limited based on a number of dropped packets over a period of time.

Figure 8:
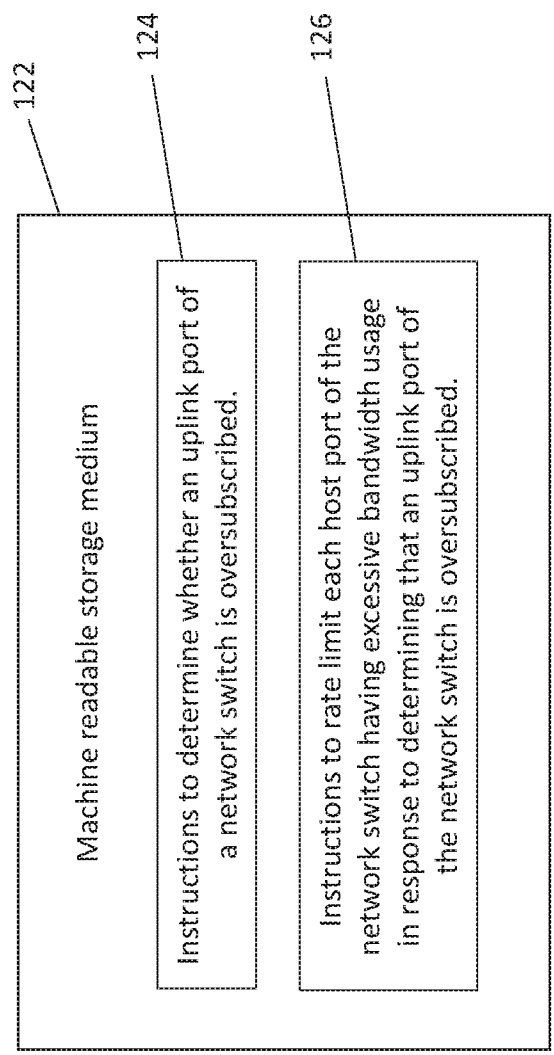
FIG. 8 is a diagram of a machine-readable storage medium, according to an example.

FIG. 8 illustrates a machine-readable storage medium 122 including various instructions that can be executed by a computer processor or other processing resource. In some implementations, medium 122 can be housed within a network switch, such as a network edge switch (e.g., switch 110) or on another forwarding device of a network which receives and forwards a given data packet or other computing device. In some implementations, medium 122 can be housed remotely from the forwarding device that receives and forwards the data packet. For example, medium 122 can be housed in a controller that is in wired or wireless communication with a network node, such as switch 110, or other forwarding device.

For illustration, the description of machine-readable storage medium 122 provided herein makes reference to various aspects of switch 110 (e.g., processing resource 146) and other implementations of the disclosure (e.g., method 128). Although one or more aspects of switch 110 (as well as instructions such as instructions 150, 152, and 154) can be applied or otherwise incorporated with medium 122, it is appreciated that in some implementations, medium 122 may be stored or housed separately from such a system. For example, in some implementations, medium 122 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof.

Medium 122 includes machine-readable instructions 124 stored thereon to cause processing resource 146 to determine whether an uplink port of a network switch is oversubscribed. Instructions 124 can incorporate one or more aspects of steps 132 of method 128 or instructions 150 of switch 110 or another suitable aspect of other implementations described herein and vice versa).

Medium 122 includes machine-readable instructions 126 stored thereon to cause processing resource 146 to rate limit each host port of the network switch having excessive bandwidth usage in response to determining that an uplink port of the network switch is oversubscribed. Instructions 126 can incorporate one or more aspects of steps 138 of method 128 or instructions 162 of switch 110 or another suitable aspect of other implementations described herein and vice versa).

Figure 9:
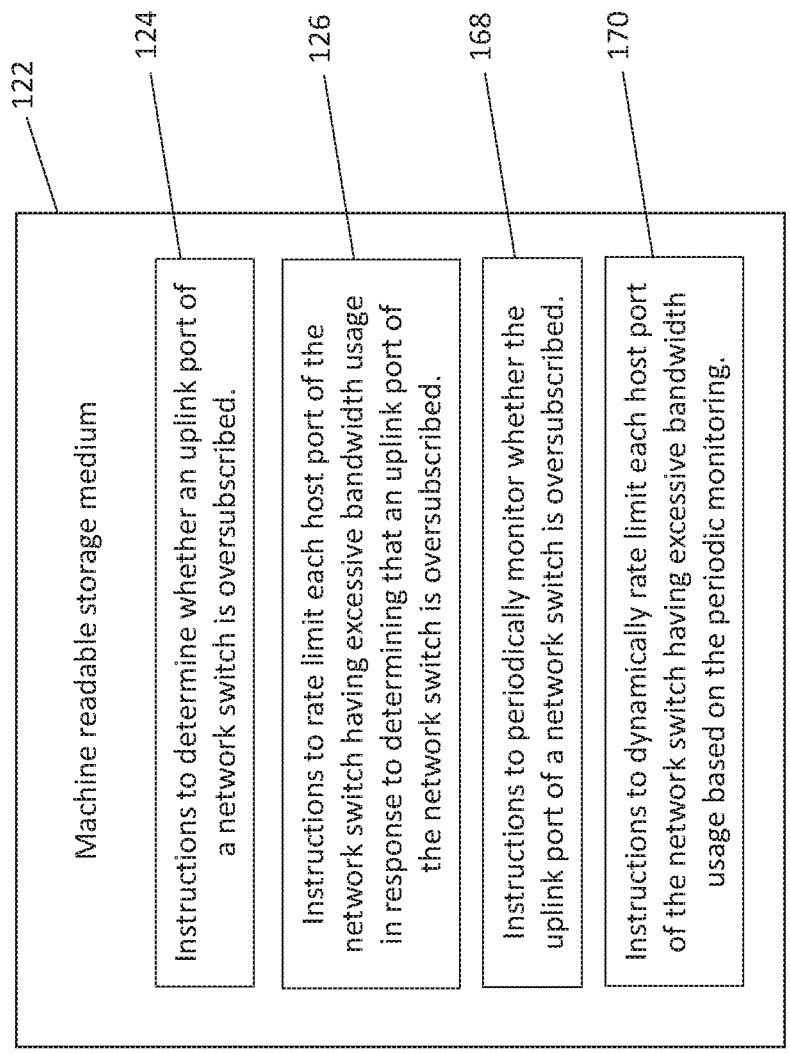
FIG. 9 is a diagram of a machine-readable storage medium, according to another example.

FIG. 9 illustrates a diagram of an example medium 122 in accordance with the present disclosure. Medium 122 of FIG. 9 is illustrated as including various aspects of medium 122 of FIG. 8 and uses many of the same reference numbers (such as for example instructions 124 and 126). However, medium 122 of FIG. 9 can include additional, alternative, or fewer components, aspects, functionality, etc., than medium 122 of FIG. 8 and is not intended to be limited by the diagram of FIG. 8 or the related disclosure thereof. It is appreciated though that medium 122 of FIG. 9 can incorporate one or more aspects of medium 122 of FIG. 8 and vice versa. For example, in some implementations, medium 122 of FIG. 8 can include the instructions described below with respect to medium 122 of FIG. 9.

Medium 122 includes machine-readable instructions 168 stored thereon to cause processing resource 146 to periodically monitor whether the uplink port of a network switch is oversubscribed. Instructions 168 can incorporate one or more aspects of steps 130 and 132 of method 128 or instructions 150 of switch 110 or another suitable aspect of other implementations described herein (and vice versa).

Medium 122 includes machine-readable instructions 170 stored thereon to cause processing resource 146 to dynamically rate limit each host port of the network switch having excessive bandwidth usage based on the periodic monitoring. Instructions 170 can incorporate one or more aspects of steps 138 of method 128 or instructions 162 of switch 110 or another suitable aspect of other implementations described herein (and vice versa).

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A method, comprising:
monitoring data traffic along an uplink port and along at least a subset of a plurality of host ports;
determining whether the uplink port is oversubscribed based on one or more reference data traffic metrics thresholds that vary dynamically;
determining whether a given host port of the at least a subset of host ports is receiving excessive data traffic in response to determining that the uplink port is oversubscribed;
flagging a host port that is determined to be receiving excessive data traffic;
rate limiting only the flagged host port among the at least a subset of the plurality of host ports, wherein an amount that the flagged host port is rate limited is based on a number of dropped data packets over a period of time; and
determine whether the rate limited flagged host port is dropping a number of packets exceeding a threshold rate;
wherein, if it is determined that the rate limited flagged host port is dropping a number of packets exceeding a threshold rate, further rate limiting only the flagged host port;
wherein, if it is determined that the rate limited flagged host port is not dropping a number of packets exceeding a threshold rate, reducing the rate limiting on only the flagged host port.

2. The method of claim 1, further comprising:
disabling the flagged host port.

3. The method of claim 1, further comprising:
generating an alert for the flagged host port; and
transmitting the alert to a network administrator.

4. The method of claim 1, wherein determining whether the given host port of the plurality of host ports is receiving excessive data traffic includes determining whether every host port of the plurality of host ports is receiving excessive data traffic.

5. The method of claim 1, wherein the monitored data traffic includes bandwidth use of the uplink port and at least a subset of the plurality of host ports.

6. The method of claim 1, wherein determining whether the uplink port is oversubscribed includes comparing data traffic metrics over the uplink port with the dynamically changing reference data traffic metrics for the uplink port.

7. The method of claim 1, wherein determining whether the given host port is receiving excessive data traffic includes comparing data traffic metrics over the given host port to reference data traffic metrics for the host port.

8. The method of claim 1, wherein the uplink port and the plurality of host ports are located on a single network switch.

9. The method of claim 8, wherein the network switch is a virtualized network switch.

10. The method of claim 1, wherein the one of the at least a subset of host ports is the flagged host port.

11. The method of claim 1, further comprising:
determining whether the uplink port drops data traffic over a period of time after rate limiting the flagged host port; and
increasing a rate limit on one of the at least a subset of host ports in response to determining that the uplink port does not drop data traffic over the period of time after rate limiting the flagged host port.

12. The method of claim 11, wherein increasing the rate limit on the another one of the at least a subset of host ports comprises increasing the rate limit on the another one of the at least a subset of host ports until a rate of data traffic along the uplink port is restored to a rate prior to rate limiting the flagged host port.

13. A non-transitory machine readable storage medium having stored thereon machine readable instructions to cause a computer processor to:
determine whether an uplink port of a network switch is oversubscribed based on one or more reference data traffic metrics thresholds that vary dynamically;
determine, for each host port of the network switch, whether that host port has excessive bandwidth usage in response to a determination that the uplink port is oversubscribed; and
rate limit, for each host port of the network switch, only that host port in response to a determination that that host port has excessive bandwidth usage, wherein an amount that each host port is rate limited is based on a number of dropped data packets over a period of time; and
determine whether the rate limited flagged host port is dropping a number of packets exceeding a threshold rate;
wherein, if it is determined that the rate limited flagged host port is dropping a number of packets exceeding a threshold rate, further rate limiting only the flagged host port;
wherein, if it is determined that the rate limited flagged host port is not dropping a number of packets exceeding a threshold rate, reducing the rate limiting on only the flagged host port.

14. The medium of claim 13, wherein the medium is located on the network switch.

15. The medium of claim 13, wherein the machine readable instructions are to cause the computer processor to:
periodically monitor whether the uplink port of a network switch is oversubscribed; and
dynamically rate limit each host port of the network switch having excessive bandwidth usage based on the periodic monitoring.

16. A network switch comprising:
an uplink port;
a plurality of host ports;
a processing resource; and
a memory resource storing machine readable instructions to cause the processing resource to:
determine whether an uplink port is oversubscribed based on one or more reference data traffic metrics thresholds that vary dynamically;
determine which, if any, of the host ports are excessively contributing to the oversubscription of the uplink port in response to a determination that an uplink port of the switch is oversubscribed;
flag each host port that is determined to be excessively contributing to the oversubscription of the uplink port; and rate limit only each flagged host port among the plurality of host ports, wherein an amount that each flagged host port is rate limited is based on a number of dropped data packets over a period of time; and determine whether the rate limited flagged host port is dropping a number of packets exceeding a threshold rate;

wherein, if it is determined that the rate limited flagged host port is dropping a number of packets exceeding a threshold rate, further rate limiting only the flagged host port;

wherein, if it is determined that the rate limited flagged host port is not dropping a number of packets exceeding a threshold rate, reducing the rate limiting on only the flagged host port.

17. The switch of claim 16, wherein the memory resource stores machine readable instructions to cause the processing resource to:

determine whether data traffic along a flagged host port is malicious;

disable the flagged host port and notifying a network administrator in response to determining that data traffic along the flagged host port is malicious; and determine whether the flagged host port should be rate limited in response to determining that data traffic along the flagged host port is not malicious.

* * * * *